(12) United States Patent
Ferris et al.

(10) Patent No.: US 11,235,527 B2
(45) Date of Patent: Feb. 1, 2022

(54) HEATER FOR 3D PRINTER AUGER SCREW

(71) Applicant: HEWLETT-PACKARD DEVELOPMENT COMPANY, L.P., Houston, TX (US)

(72) Inventors: Cristian Ferris, Sant Cugat del Valles (ES); Elena Laso Plaza, Sant Cugat del Valles (ES); Esteve Comas, Sant Cugat del Valles (ES); Pau Martin Vidal, Sant Cugat del Valles (ES); Gerard Mosquera, Sant Cugat del Valles (ES); Anna Torrent, Sant Cugat del Valles (ES); Adrien Chiron, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 6 days.

(21) Appl. No.: 16/097,265

(22) PCT Filed: May 12, 2016

(86) PCT No.: PCT/US2016/032159
§ 371 (c)(1),
(2) Date: Oct. 28, 2018

(87) PCT Pub. No.: WO2017/196352
PCT Pub. Date: Nov. 16, 2017

(65) Prior Publication Data
US 2019/0134906 A1    May 9, 2019

(51) Int. Cl.
*B29C 64/321*    (2017.01)
*B33Y 30/00*    (2015.01)
(Continued)

(52) U.S. Cl.
CPC .......... *B29C 64/321* (2017.08); *B29C 64/295* (2017.08); *B29C 64/386* (2017.08);
(Continued)

(58) Field of Classification Search
CPC .... B29C 64/295; B29C 64/321; B29C 64/153
See application file for complete search history.

(56) References Cited

U.S. PATENT DOCUMENTS 7,419,632 B2    9/2008    Keller
7,521,652 B2    4/2009    Chung et al.
(Continued)

FOREIGN PATENT DOCUMENTS

CN    201168782 Y    12/2008
CN    102400434 A    4/2012
(Continued)

OTHER PUBLICATIONS

International Search Report and Written Opinion for international Application No. PCT/US2016/032159, dated Feb. 3, 2017, 11 pages.

*Primary Examiner* — Marc C Howell
*Assistant Examiner* — John J DeRusso
(74) *Attorney, Agent, or Firm* — HP Inc. Patent Department

(57) ABSTRACT

In example implementations, an apparatus includes a storage unit, an auger screw, a housing enclosing the auger screw and at least one heater coupled to the housing. The augers screw receives a build material from the storage unit and delivers the build material to a build platform via movement of the auger screw. The build material is heated by the at least one heater as the build material is being moved by the auger screw.

6 Claims, 7 Drawing Sheets

(51) Int. Cl.
  *B33Y 40/00*     (2020.01)
  *B29C 64/295*    (2017.01)
  *B29K 105/00*    (2006.01)
  *B33Y 10/00*     (2015.01)
  *B33Y 50/02*     (2015.01)
  *B29C 64/386*    (2017.01)

(52) U.S. Cl.
  CPC .............. *B33Y 10/00* (2014.12); *B33Y 30/00* (2014.12); *B33Y 40/00* (2014.12); *B33Y 50/02* (2014.12); *B29K 2105/251* (2013.01)

(56) References Cited

U.S. PATENT DOCUMENTS

| | | | |
|---|---|---|---|
| 8,718,522 B2 | 5/2014 | Chillscyzn et al. | |
| 2001/0045678 A1* | 11/2001 | Kubo | B29C 64/165 264/37.29 |
| 2003/0126346 A1 | 7/2003 | Kuo | |
| 2004/0118309 A1 | 6/2004 | Fedor et al. | |
| 2005/0263934 A1 | 12/2005 | Chung et al. | |
| 2005/0280185 A1 | 12/2005 | Russell et al. | |
| 2012/0285340 A1* | 11/2012 | Hsu | B41J 11/002 101/216 |
| 2013/0186514 A1* | 7/2013 | Zhuang | B22F 1/0003 141/11 |
| 2014/0178585 A1 | 6/2014 | Swanson et al. | |
| 2014/0363327 A1 | 12/2014 | Holcomb | |
| 2015/0246481 A1 | 9/2015 | Schlick et al. | |
| 2015/0367418 A1 | 12/2015 | Buller et al. | |
| 2016/0082662 A1 | 3/2016 | Majer | |
| 2016/0200024 A1* | 7/2016 | Kim | B29C 48/82 425/143 |
| 2016/0263822 A1* | 9/2016 | Boyd, IV | B23K 26/00 |
| 2016/0361874 A1* | 12/2016 | Park | B29C 64/393 |
| 2019/0126346 A1* | 5/2019 | Graichen | B33Y 30/00 |

FOREIGN PATENT DOCUMENTS

| | | |
|---|---|---|
| CN | 103442877 | 12/2013 |
| CN | 103978685 A | 8/2014 |
| EP | 3002108 A1 | 4/2016 |
| EP | 3112136 A2 | 1/2017 |
| JP | 2000249954 A | 9/2000 |
| KR | 20160036955 A | 4/2016 |
| WO | WO-2016050311 A1 | 4/2016 |

* cited by examiner

HEATER FOR 3D PRINTER AUGER SCREW

BACKGROUND

Three dimensional (3D) printers are becoming more ubiquitous as costs for the printers come down. 3D printers, also referred to as additive manufacturing machines, typically operate by using a material to generate a 3D object layer-by-layer.

In some 3D printing systems, powder is delivered to a build platform from a powder storage unit that is typically an open container or bucket. A layer of the powder is leveled and excess powder is usually returned to the open powder storage unit. Portions of the layer of powder can be printed and fused using an energy source. The 3D printing system can operate at high temperatures to melt and fuse the portions of powder that are printed when building a part.

DETAILED DESCRIPTION

The present disclosure discloses a heater for a 3D printer auger screw and methods for controlling the heater and increasing the overall performance of the 3D printing system. As described above, some 3D printing systems deliver powder to a build platform and roll the powder to form an even layer of powder. Then, the layer of powder may be pre-heated before the powder is printed and fused to build a 3D part.

The present disclosure improves the efficiency of the 3D printing system by eliminating the need to pre-heat the build material on the build platform, while increasing the 3D printed part quality by pre-heating the build material prior to the layer that is spread. Rather, examples of the present disclosure provide heaters onto a housing of an auger screw (also known as an Archimedes screw). The build material on the auger screw, and inside the housing, can be pre-heated to a desired temperature as the build material is lifted up. The movement of the build material while being heated also helps to improve heating efficiency using principles of convection as opposed to heating a still powder by just conduction means.

Furthermore, by pre-heating the build material within a housing of the auger screw and delivery trays allows for a more constant heat to be applied. For example, pre-heating the build material by lamps after the build material is layered on the build platform can lead to uneven temperatures due to shadows created by other components (e.g., a recoating element in the printer, or other carriages).

As a result, the efficiency of the 3D printing system may be improved as the powder may be heated while being delivered. In addition, the extra step of pre-heating the powder on the build platform after being delivered and leveled can be eliminated and the time needed for the job may be reduced.

Figure 1:
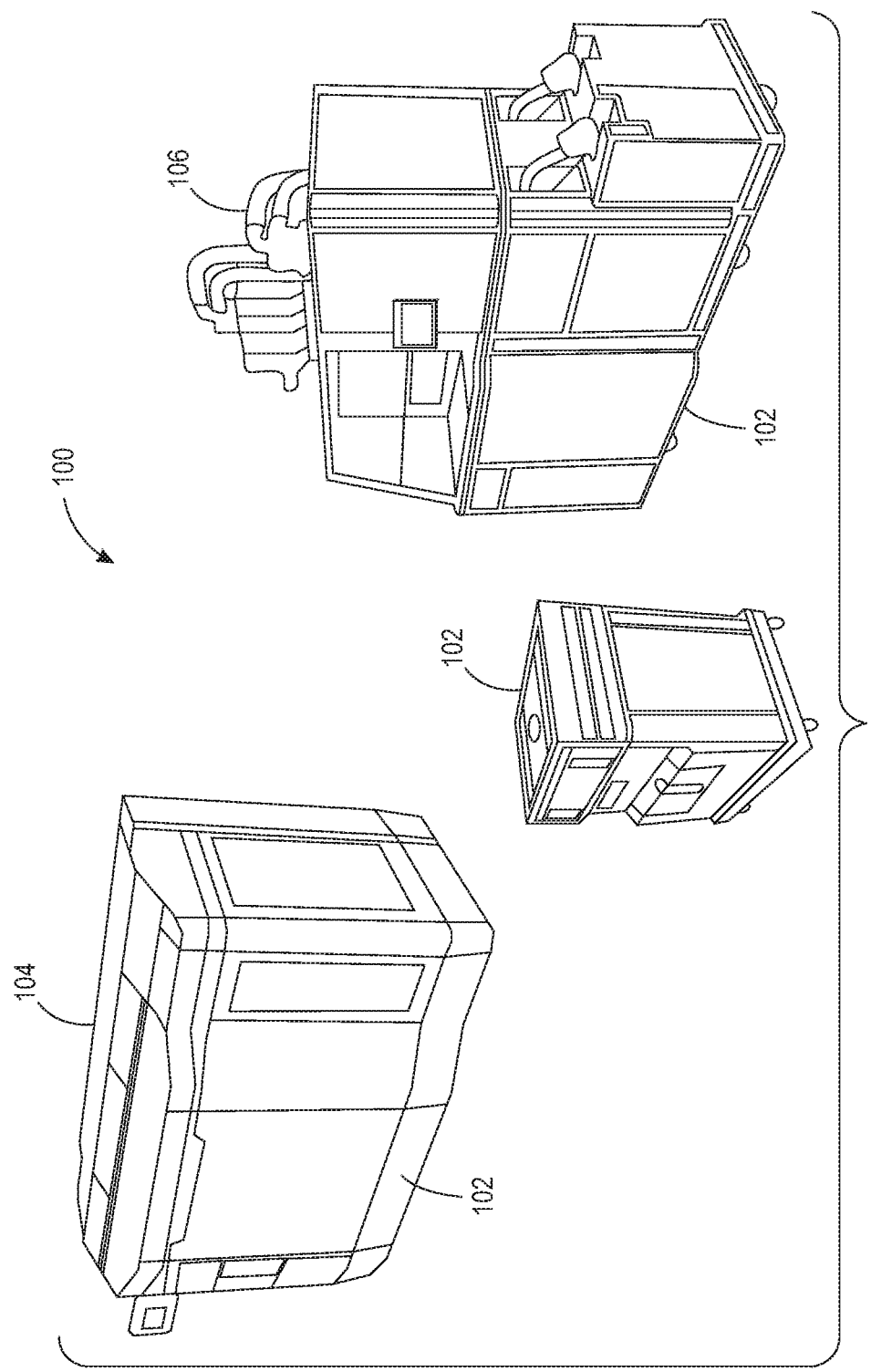
FIG. 1 is a block diagram of a side view of an example of a 3D printing system of the present disclosure.

FIG. 1 illustrates an example of a 3D printing system 100. The 3D printing system may include a build unit 102, a printer or 3D printer 104 and a powder supply/post-processing component 106. In one implementation, the build unit 102 may store a powder that is used to build a part using additive printing/processing layer by layer. In addition, the build unit 102 may provide a build platform upon which the part is built. The powder may be delivered up from the sides of the build unit 102 onto the build platform. The build platform may move lower after each layer is printed.

In one example, the build unit 102 may be connected to the powder supply/post-processing component 106 to receive the powder. For example, FIG. 1 shows the powder supply/post-processing component 106 with the build unit 102 connected.

After the build unit 102 receives the powder, the build unit 102 may be disconnected from the powder supply/post-processing component 106 and connected to the printer 104. FIG. 1 shows the printer 104 with the build unit 102 connected.

In some implementations, the printer 104 may have a print head for applying a fusing agent to areas of the powder that will be fused to print a layer of the part that is being printed. The print head may also apply a detailing agent on some areas of the powder to help prevent the powder from fusing in the areas that will not be fused. Then the printer 104 may have an element that applies energy to fuse the areas of the powder with the fusing agent. The build platform of the build unit 102 may be lowered and a new layer of powder may be added on top of the layer of powder that was printed. The process may be repeated until the part is completed.

In one example, the process may be improved by pre-heating the build material in a delivery mechanism before the build material is delivered to a build platform of the build unit 102. As a result, the step of pre-heating the build material on the build platform before printing and fusing may be eliminated.

The build unit 102 may be removed from the printer 104 after printing of the part has completed. The build unit 102 can then be connected to the powder supply/post-processing component 106 again to extract the part. In addition, the powder supply/post-processing component 106 may also recover and recycle the unfused powder.

Figure 2:
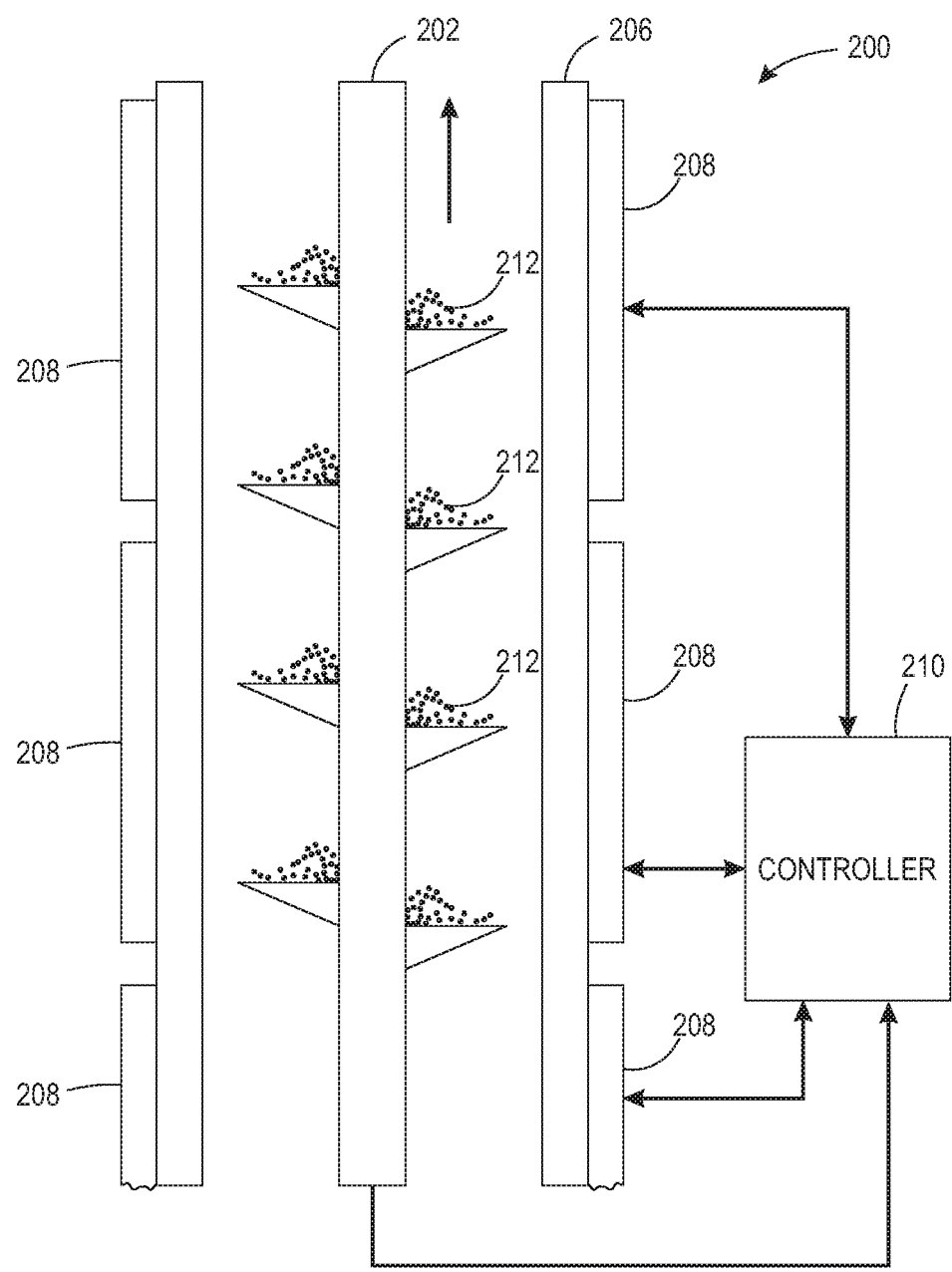
FIG. 2 is a block diagram of an example apparatus of the present disclosure.

FIG. 2 illustrates an example block diagram of an apparatus 200. The apparatus 200 may be a delivery mechanism in the build unit 102. In one example, the apparatus 200 may include at least one auger screw 202 (also referred to as an Archimedes screw). The auger screw 202 may lift a build material 212 that is used for building the 3D part upwards by the rotation of the auger screw 202. In one example, the build material 212 may be a powder. The powder may be a metallic powder, a ceramic powder, a thermoplastic powder, and the like.

In one example, the auger screw 202 may be enclosed by a housing 206. In one example, the housing 206 may have a cylindrical shape. In one implementation, at least one heater 208 may be coupled to the housing 206. The at least one heater 208 may heat the build material 212 up to a temperature threshold or a desired temperature range.

In one example, the temperature threshold may be a tolerance value of a temperature and a desired temperature. For example, the desired temperature may be a temperature just below the melting point of the build material 212 and the temperature threshold may be an acceptable temperature difference from the desired temperature. In other words, if the desired temperature is 100 degrees Celsius (° C.) and the acceptable minimum temperature is 80° C., then the temperature threshold may be 20° C.

In another example, the desired temperature range may be a temperature range that is just below a melting point of the build material 212. The temperature range may be within a few degrees of the desired temperature range. For example, if the melting point of the build material 212 is 100° C., then the desired temperature may be 99° C. and the desired temperature range may be 95° C. to 99° C.

It should be noted that the values described above are provided as examples. The exact values of the temperature threshold and desired temperature range may be a function of the type of build material 212 that is used for a particular application or print job. Different types of build materials 212 may have different temperature thresholds or desired temperature ranges.

In one example, the heater 208 may be a flexible silicone heater. The heater 208 may be wrapped around the housing 206. In one implementation, a plurality of heaters 208 may be coupled to the housing 206 along a length of the housing 206. The plurality of heaters 208 may evenly heat the build material 212 as the build material moves up along the length of the housing 206.

The apparatus 200 may also include a controller 210. The controller 210 may include a processor and a non-transitory computer readable storage medium. The non-transitory computer readable storage medium may store instructions for performing functions described herein that are executed by the processor.

In one implementation, the controller 210 may control movement of the auger screw 202 and an amount of heat generated by the heater 208. For example, the controller 210 may move the auger screw 202 faster or slower based on a temperature of the build material 212 that is delivered. In another example, the controller 210 may control the heater 208 to apply more heat or less heat based on a temperature of the build material 212 that is delivered. In one implementation, the controller 210 may control a combination of the movement of the auger screw 202 and the amount of heat applied by the heater 208 to adjust the temperature of the build material 212. Further details of the adjustments made by the controller 210 is discussed below.

Figure 3:
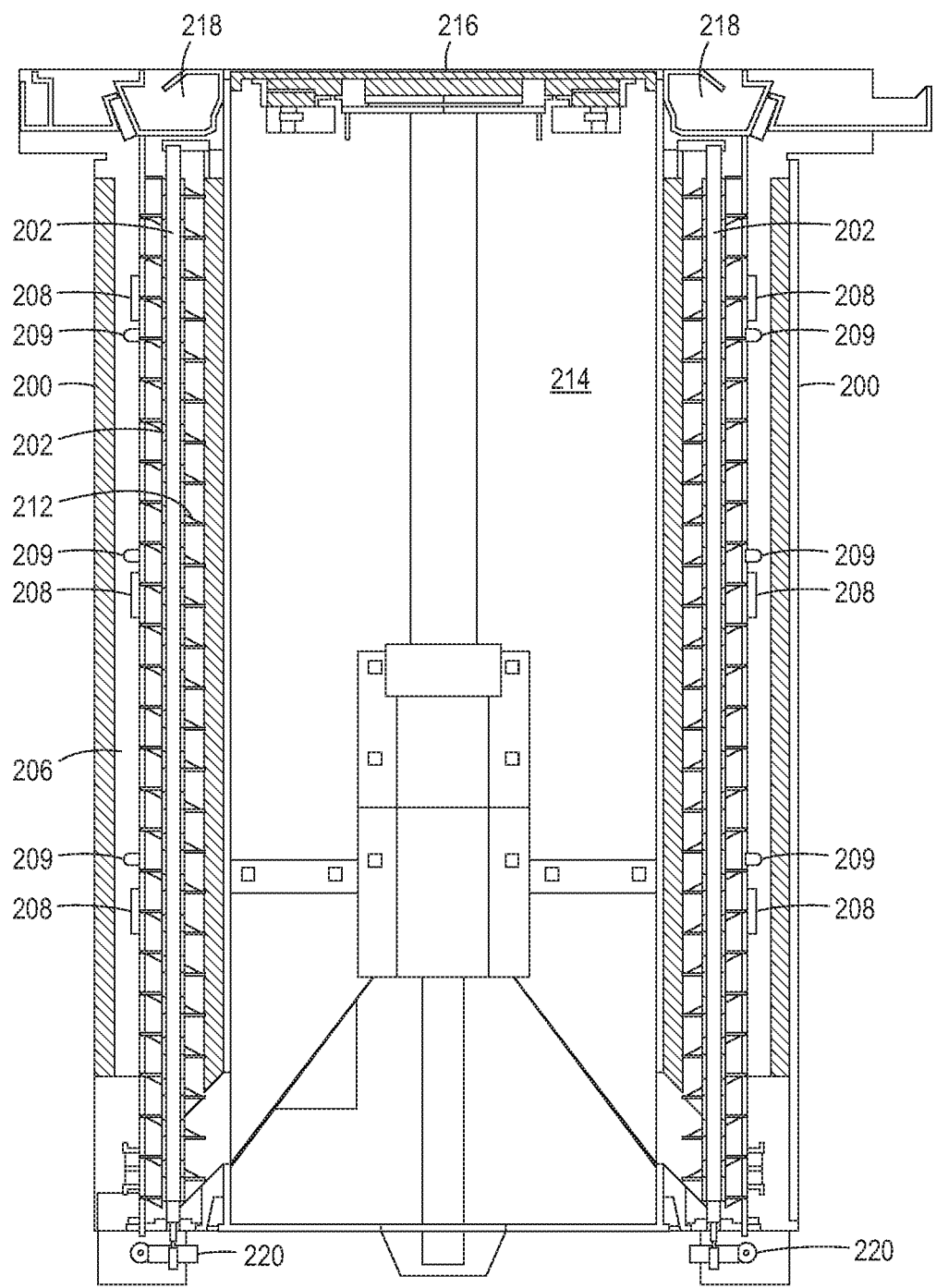
FIG. 3 is a cross-sectional side view of the example build unit having the apparatus of the present disclosure.

FIG. 3 illustrates a cross-sectional side view of the example build unit 102 having the apparatus 200 of the present disclosure. In one implementation, the build unit 102 may have an apparatus 200 on each side of a storage unit 214 of the build unit 102. A motor 220 may be coupled to the auger screw 202 to rotate, or move, the auger screw 202. The controller 210 may be in communication with the motor 220 to control movement of the auger screw 202.

In one implementation, an auger temperature sensor 209 may be coupled to the housing 206. In one example, when more than one heater 208 is deployed, each heater 208 may have at least one corresponding auger temperature sensor 209. The auger temperature sensor 209 may be in communication with the controller 210 and provide a temperature measurement of the build material 212 inside of the housing 206.

The storage unit 214 may hold the build material 212. The auger screw 202 move the build material 212 collected from the storage unit 214 upwards toward a feed tray 218. The auger screw 202 may move the build material 212 as the auger screw 202 rotates. The build material 212 may exit the feed tray 218 onto a build platform 216. The build material 212 may then be leveled, printed and fused by the printer 104.

Figure 4:
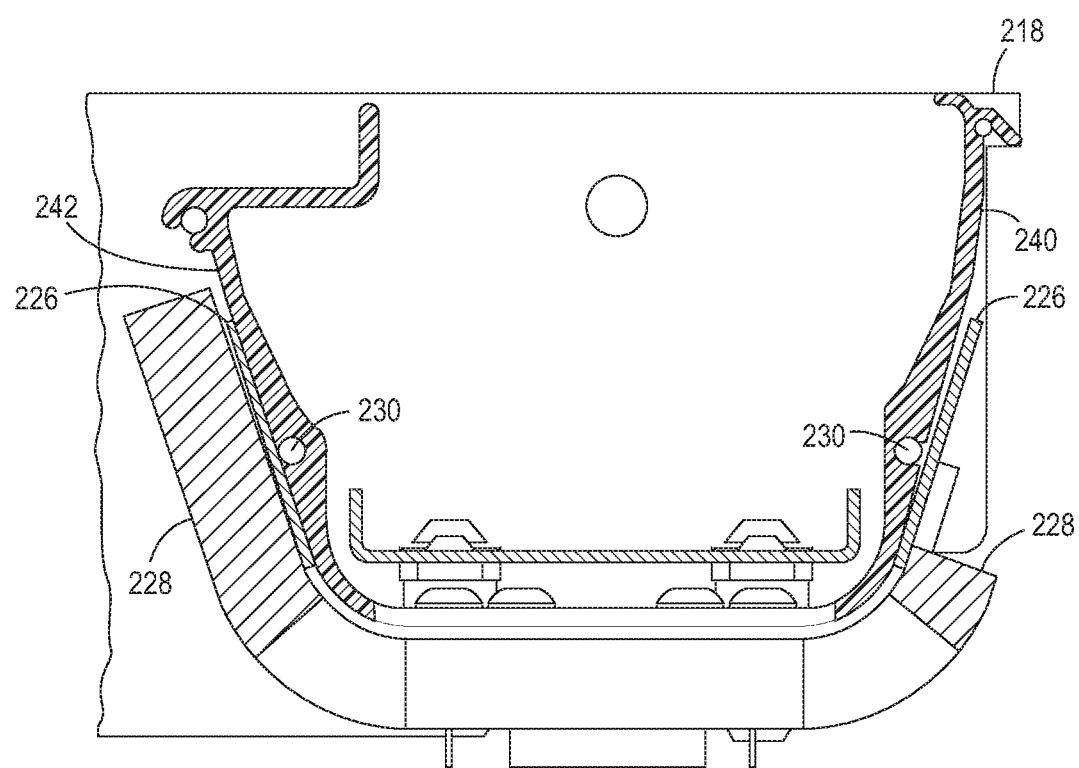
FIG. 4 is a cross-sectional view of an example feed tray.

FIG. 4 illustrates a cross-sectional view of the example feed tray 218. In one implementation, the feed tray 218 may include at least one feed tray heater 226 and a temperature sensor 230. In one implementation, the feed tray 218 may have a feed tray heater 226 coupled to each side wall 240 and 242, opposite one another, of the feed tray 218. The feed tray heater 226 and corresponding temperature sensor 230 may be in communication with, and controlled by, the controller 210.

In one example, the feed tray heater 226 may include two internal heating circuits for individual control. One internal circuit may cover a wall 240 facing the print zone (e.g., towards the build platform 216) and the other internal circuit may cover a wall 242 facing the exterior side.

In one implementation, a feed tray insulator layer 228 may be applied over the feed tray heater 226 and the corresponding wall 240 or 242. The feed tray insulator layer 228 may be comprised of any non-conductive material. The feed tray insulator layer 228 may help the feed tray heater 226 to operate more efficiently by preventing heat loss to the surroundings. The feed tray insulator layer 228 may also prevent undesired heating of other components near the feed tray 218.

In one example, the temperature sensor 230 may be in communication with the controller 210. The temperature sensor 230 may measure the temperature of the build material 212 as the build material 212 fills the feed tray 218. In another example, a temperature sensor may be located near an exit of the auger screw 202 to measure the temperature of the build material 212. The measured temperature may then be transmitted to the controller 210.

Figure 5:
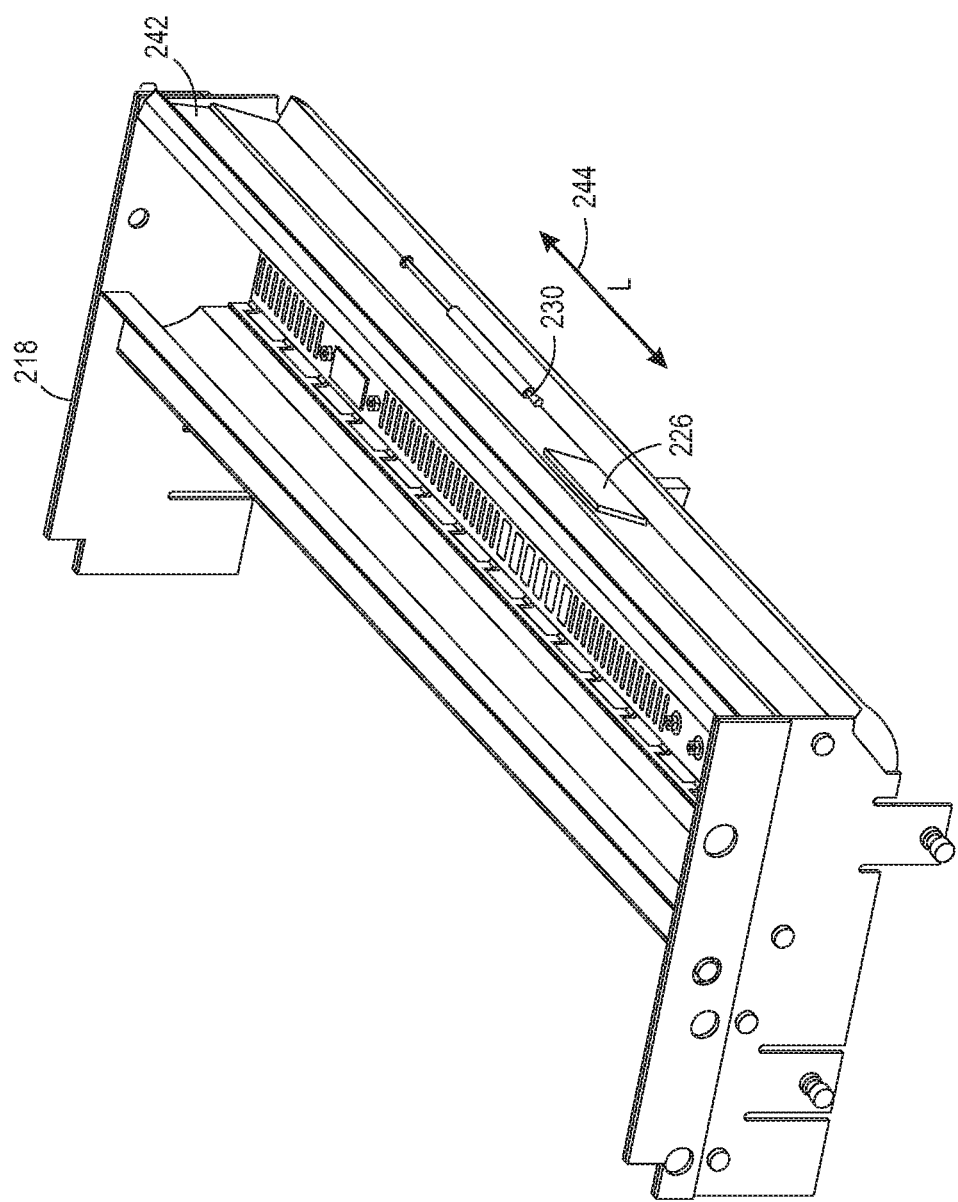
FIG. 5 is an isometric view of the example feed tray.

FIG. 5 illustrates an isometric view of the example feed tray 218. FIG. 5 illustrates how the feed tray heater 226 is located along a length 244 of the wall 242 of the feed tray 218. FIG. 5 illustrates an example location of the temperature sensor 230 located at approximately a center of the wall 242. The feed tray heater 226 and the temperature sensor 230 may be similarly situated on the wall 240.

As discussed above, the controller 210 may compare the measured temperature to the temperature threshold or the desired temperature range. When the temperature that is measured falls below the threshold temperature, or outside of the desired temperature range, the controller 210 may make an adjustment.

In one implementation, the adjustment may be to adjust an amount of heat that is generated by the heater 208. For example, if the heater 208 is capable of providing varying levels of heat, the level of heat output may be adjusted by the controller. In other implementations when the heater 208 turns on and off, the controller 210 may "pulse" the heater 208 by turning the heater 208 on and off in a controlled manner to adjust the amount of heat that is generated by the heater 208.

In one implementation, the adjustment may be to adjust movement of the auger screw 202. For example, a speed of movement of the auger screw 202 may be increased or decreased (e.g., via the motor 220). As described above, moving the build material 212 may help heating efficiency using the principles of convection. Moving the build material 212 during heating helps to increase the heat transfer rate compared to keeping the build material 212 still (i.e., stationary). Thus, increasing the speed of movement or rotation of the auger screw 202 may help to increase heating of the build material 212. In contrast, when the build material 212 is still, the heating efficiency may be reduced. Thus, slowing down or stopping the auger screw 202 may help to reduce the heating of the build material 212.

In one implementation, a combination of adjusting the amount of heat generated by the heater 208 and adjusting the speed of movement of the auger screw 202 may be applied by the controller 210. For example, the speed of movement of the auger screw 202 may be slightly increased while the amount of heat generated by the heater 208 may be slightly decreased, or vice versa.

Figure 6:
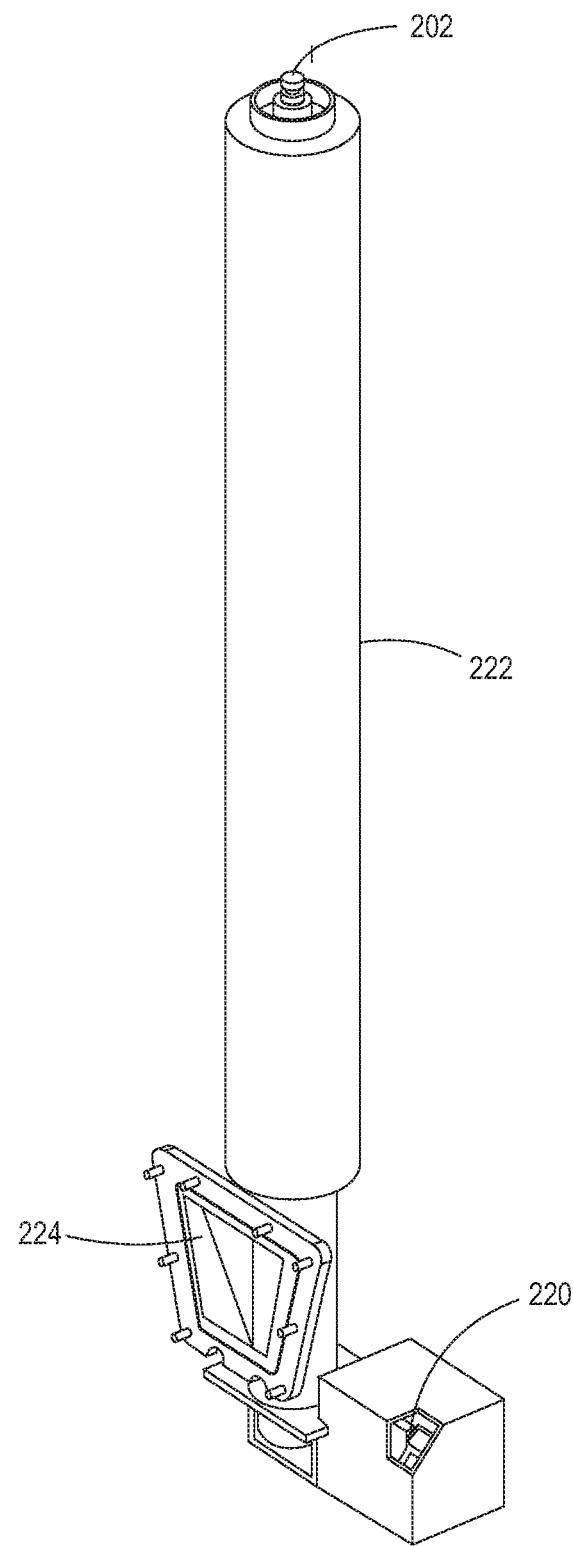
FIG. 6 is an isometric view of an example of the apparatus with an insulation layer.

FIG. 6 illustrates an isometric view of the example apparatus 200. FIG. 6 illustrates an opening 224 that allows the build material 212 to access the auger screw 202 in the housing 206. The build material 212 may be delivered to the auger screw 202 through the opening 224 that is coupled to an opening in the storage unit 214. FIG. 6 also illustrates the motor 220 within a gear box.

In one implementation, the apparatus 200 may have an insulation layer 222. For example, the insulation layer 222 may be comprised of any non-conductive material. In one implementation, the insulation layer 222 may be coupled or wrapped around the heater 208 and the housing 206. The insulation layer 222 may prevent heat generated by the heater 208 from unintentionally heating other components within the build unit 102.

Figure 7:
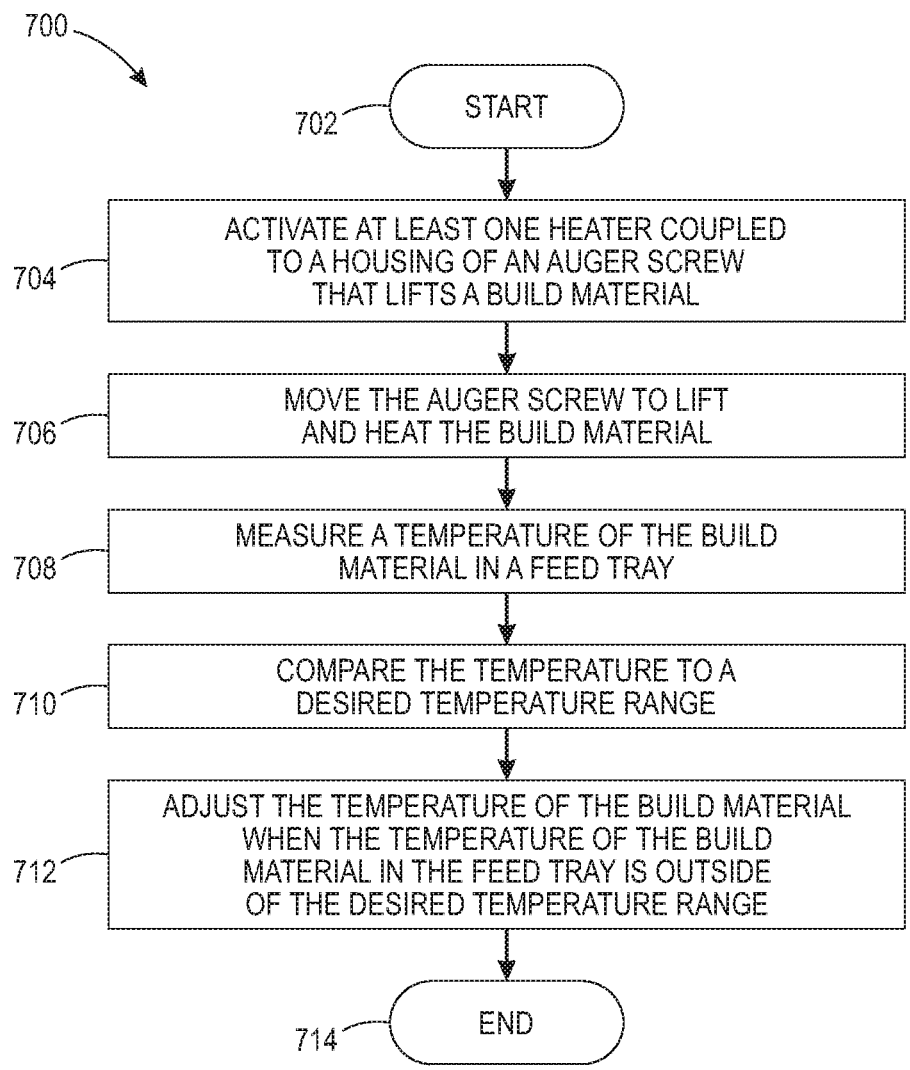
FIG. 7 is a flow diagram of an example method for controlling a 3D printer auger screw.

FIG. 7 illustrates a flow diagram of an example method 700 for controlling a 3D printer auger screw. In one example, the blocks of the method 700 may be performed by the controller 210.

At block 702, the method 700 begins. At block 704, the method 700 activates at least one heater coupled to a housing of an auger screw that lifts a build material. An initial amount of heat delivered by the at least one heater may be a function of the type of build material that is being used, the current temperature of the build material and the desired temperature.

At block 706, the method 700 moves the auger screw to lift and heat the build material. For example, the controller may activate a motor coupled to the auger screw to begin rotating the auger screw. In one example, the speed of rotation or movement of the auger screw may be set to a speed that provides enough time and heat transfer rate to allow the build material to be heated to a desired temperature while the auger screw is moving.

At block 708, the method 700 measures a temperature of the build material in a feed tray. For example, a temperature sensor proximate to, or near, the feed tray may measure the temperature of the build material. The measured temperature may then be transmitted to the controller.

At block 710, the method 700 compares the temperature to a desired temperature range. For example, the desired temperature range may provide a tolerance for heating the build material to a temperature just below a melting point of the build material. The comparison of the temperature that is measured to the desired temperature range may ensure that the temperature of the build material is not too hot or not too cold.

In some implementations, the temperature maybe compared to a temperature threshold. For example, the temperature threshold may be a desired temperature less a minimum acceptable temperature.

At block 712, the method 700 adjusts the temperature of the build material when the temperature of the build material in the feed tray is outside of the desired temperature range. When the temperature of the build material falls outside of the desired temperature range, the controller may make an adjustment to adjust the temperature of the build material.

In one example, the controller may adjust an amount of heat delivered by the heater. For example, the amount of heat may be increased or decreased. In another example, the controller may turn the heater on and off to "pulse" the heater to control the amount of heat that is delivered.

In another example, the controller may adjust a speed of movement of the auger screw. For example, the speed may be increased, decreased or stopped. In another example, the controller may adjust the amount of heat delivered by the heater and the speed of movement of the auger screw.

In one implementation, the blocks 708, 710 and 712 may be repeated as part of a continuous feedback loop. For example, the controller may continuously monitor a temperature of the build material that exits the feed tray and make adjustments whenever the temperature falls below a temperature threshold or outside of the desired temperature range. At block 714, the method 700 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A build unit to build a part using additive layer by layer processing, the build unit comprising:
   a storage unit configured to store powdered build material;
   a build platform disposed at a top of the storage unit;
   a feed tray on a side of the build platform from which pre-heated powdered build material is delivered onto the build platform;
   a powdered build material delivery apparatus on a side of the storage unit, the delivery apparatus comprising:
      a powder-moving auger screw configured to receive powdered build material from the storage unit and to deliver pre-heated powdered build material to the feed tray via movement of the auger screw;
      a housing enclosing the auger screw; and
      at least one heater directly coupled to and wrapped around the housing configured to heat the powdered build material as the powdered build material is being moved by the auger screw.

2. The build unit of claim 1, wherein the at least one heater comprises a plurality of heaters spaced along a length of the housing and at least one temperature sensor coupled to the housing.

3. The build unit of claim 1, wherein the at least one heater comprises a flexible silicone heater.

4. The build unit of claim 1, wherein the feed tray comprises:
   a feed tray heater; and
   a temperature sensor.

5. The build unit of claim 4, further comprising a controller to control a speed of the auger screw based on a temperature of the powdered build material measured by the temperature sensor in the feed tray or in an exit of the auger screw.

6. The build unit of claim 1, comprising:
   an insulation layer coupled to the at least one heater.

* * * * *